(12) United States Patent
Kobayashi et al.

(10) Patent No.: US 11,431,877 B2
(45) Date of Patent: Aug. 30, 2022

(54) IMAGE PROCESSING DEVICE, METHOD OF EMBEDDING LATENT IMAGE, AND NON-TRANSITORY, COMPUTER-READABLE STORAGE MEDIUM

(71) Applicants: Ryo Kobayashi, Kanagawa (JP); Mika Inoue, Kanagawa (JP)

(72) Inventors: Ryo Kobayashi, Kanagawa (JP); Mika Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/908,764

(22) Filed: Jun. 23, 2020

(65) Prior Publication Data
US 2020/0412916 A1    Dec. 31, 2020

(30) Foreign Application Priority Data

Jun. 25, 2019   (JP) .............................. JP2019-117945

(51) Int. Cl.
| | | |
|---|---|---|
| *H04N 19/467* | (2014.01) | |
| *H04N 1/60* | (2006.01) | |
| *G03G 15/043* | (2006.01) | |

(52) U.S. Cl.
CPC ......... *H04N 1/6052* (2013.01); *G03G 15/043* (2013.01); *H04N 1/6011* (2013.01)

(58) Field of Classification Search
CPC ........... H04N 1/32144; H04N 1/32149; H04N 1/32288; H04N 1/32309; G06T 2201/0051; G06T 2201/0062

USPC ....................... 358/1.18, 517, 533, 3.28, 3.07
See application file for complete search history.

(56) References Cited

U.S. PATENT DOCUMENTS

| | | | |
|---|---|---|---|
| 6,993,149 B2* | 1/2006 | Brunk | ................... G06K 15/02 382/100 |
| 2005/0058476 A1* | 3/2005 | Murakami | ......... H04N 1/00883 399/366 |
| 2007/0002378 A1 | 1/2007 | Nako | |
| 2007/0262579 A1 | 11/2007 | Bala et al. | |

(Continued)

FOREIGN PATENT DOCUMENTS

| | | |
|---|---|---|
| CN | 1893533 A | 1/2007 |
| CN | 101249764 A | 8/2008 |

(Continued)

OTHER PUBLICATIONS

Extended European Search Report dated Nov. 4, 2020 in European Patent Application No. 20181372.2, 8 pages.

(Continued)

*Primary Examiner* — Jamares Q Washington
(74) *Attorney, Agent, or Firm* — Xsensus LLP

(57) ABSTRACT

An image processing device includes circuitry. The circuitry is configured to process a background image into which a latent image is embedded, to obtain an effect to conceal the latent image. The circuitry is configured to perform color conversion of the background image to obtain a color-matching masking effect to conceal the latent image. The circuitry is configured to embed the latent image in the background image processed and converted, to generate an image embedded with the latent image.

20 Claims, 20 Drawing Sheets

(56) References Cited

U.S. PATENT DOCUMENTS

| | | | |
|---|---|---|---|
| 2008/0199785 A1* | 8/2008 | Bala | B41M 3/144 |
| | | | 430/5 |
| 2008/0304696 A1 | 12/2008 | Eschbach et al. | |
| 2010/0157377 A1 | 6/2010 | Zhao et al. | |
| 2013/0135422 A1 | 5/2013 | Kobayashi | |
| 2013/0250366 A1* | 9/2013 | Kinoshita | G06K 15/1892 |
| | | | 358/3.28 |
| 2014/0334665 A1* | 11/2014 | Quinn | G09C 5/00 |
| | | | 382/100 |

FOREIGN PATENT DOCUMENTS

| | | |
|---|---|---|
| EP | 1 961 577 A2 | 8/2008 |
| JP | 7-319347 | 12/1995 |
| JP | 10-198222 | 7/1998 |
| JP | 2011-041119 | 2/2011 |

OTHER PUBLICATIONS

Office Action dated Dec. 16, 2021, in corresponding Chinese patent Application No. 202010562689.2, 12 pages.

* cited by examiner

BACKGROUND COLOR

BACKGROUND IMAGE        MASK IMAGE: EX. 1        MASK IMAGE: EX. 2

MAXIMUM PRINT AMOUNT OF BLACK TO BE EMBEDDED

K-GRAY AND CMY IN EQUAL AMOUNT ARE NOT ALWAYS METAMERS

PRINT AMOUNTS OF CMY

MAXIMUM PRINT AMOUNT OF BLACK TO BE EMBEDDED

CALCULATE CMY-GRAY COMPONENT CORRESPONDING TO DENSITY OF BLACK TO BE EMBEDDED TO ATTAIN METAMERIC COLOR MATCH

PRINT AMOUNTS OF CMY

FIG. 9

| PRINT AMOUNT OF K | PRINT AMOUNT OF C | PRINT AMOUNT OF M | PRINT AMOUNT OF Y |
|---|---|---|---|
| 4% | 6% | 4% | 3% |
| 8% | 11% | 8% | 7% |
| 12% | 17% | 11% | 10% |
| 16% | 22% | 15% | 13% |
| 20% | 25% | 19% | 17% |
| 24% | 29% | 22% | 20% |
| 27% | 34% | 25% | 23% |
| 31% | 38% | 29% | 27% |
| 35% | 44% | 33% | 32% |
| 39% | 48% | 38% | 36% |
| 43% | 51% | 41% | 40% |
| 47% | 55% | 45% | 44% |
| 51% | 59% | 50% | 47% |
| 55% | 62% | 55% | 51% |
| 59% | 66% | 59% | 56% |
| 63% | 71% | 64% | 60% |
| 67% | 76% | 69% | 64% |
| 71% | 80% | 74% | 69% |
| 75% | 84% | 78% | 72% |
| 78% | 89% | 82% | 75% |
| 82% | 93% | 86% | 77% |
| 86% | 94% | 87% | 78% |
| 90% | 95% | 87% | 77% |
| 94% | 95% | 88% | 76% |
| 98% | 95% | 88% | 76% |
| 100% | 95% | 88% | 76% |

IMAGE EMBEDDED
WITH LATENT IMAGE
(CMYK PLATES)

LATENT IMAGE
(K-PLATE
DATA)

VISUAL IMAGE

IR DEVICE IMAGE

FIG. 20

| LARGE | SMALL | SMALL | LARGE |
|---|---|---|---|
| LARGE | SMALL | SMALL | LARGE |
| LARGE | MIDDLE | MIDDLE | LARGE |
| SMALL | MIDDLE | MIDDLE | SMALL |

FIG. 21

| LARGE | SMALL | SMALL | LARGE |
|---|---|---|---|
| LARGE | SMALL | SMALL | MIDDLE |
| LARGE | MIDDLE | MIDDLE | MIDDLE |
| MIDDLE | MIDDLE | MIDDLE | SMALL |

| EMBEDD-ABLE | — | — | — |
|---|---|---|---|
| EMBEDD-ABLE | — | — | — |
| EMBEDD-ABLE | — | — | — |
| — | — | — | — |

LATENT IMAGE

IMAGE PROCESSING DEVICE, METHOD OF EMBEDDING LATENT IMAGE, AND NON-TRANSITORY, COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2019-117945, filed on Jun. 25, 2019, in the Japan Patent Office, the entire disclosure of which is hereby incorporated by reference herein.

BACKGROUND

Technical Field

Embodiments of the present disclosure relate to an image processing device, a method of embedding a latent image, and a non-transitory, computer-readable storage medium storing computer-readable program code that causes a computer to perform the method of embedding a latent image.

Related Art

There are known several infrared latent image printing techniques of printing an image embedded with an infrared latent image as information that is invisible under normal light and detectable simply by an infrared light sensing device.

SUMMARY

In one embodiment of the present disclosure, a novel image processing device includes circuitry. The circuitry is configured to process a background image into which a latent image is embedded, to obtain an effect to conceal the latent image. The circuitry is configured to perform color conversion of the background image to obtain a color-matching masking effect to conceal the latent image. The circuitry is configured to embed the latent image in the background image processed and converted, to generate an image embedded with the latent image.

Also described are novel method of embedding a latent image and non-transitory, computer-readable storage medium storing computer-readable program code that causes a computer to perform the method of embedding a latent image.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 9 is a reference table illustrating a relationship between an amount of black to be embedded and corresponding print amounts of cyan, magenta, and yellow that generate gray;

FIG. 20 is a diagram illustrating an example of determination of a visual masking degree for the background image segmented as illustrated in FIG. 19;

FIG. 21 is a diagram illustrating an example of determination of a color-matching masking degree for the background image segmented as illustrated in FIG. 19;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
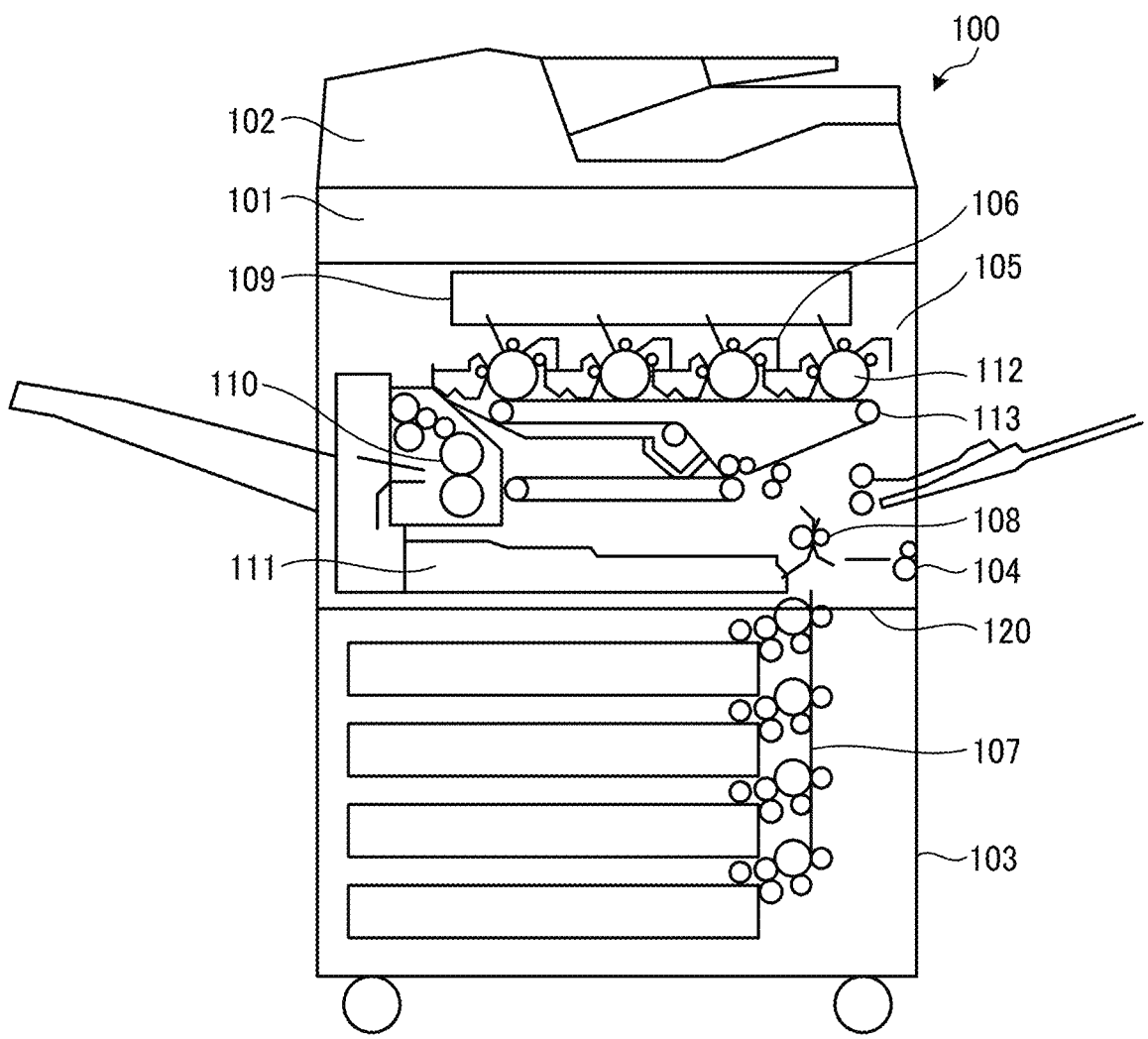
FIG. 1 is a schematic cross-sectional view of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIGS. 1 to 16B, a description is given of a first embodiment of the present disclosure.

FIG. 1 is a schematic cross-sectional view of an image forming apparatus 100 according to the first embodiment of the present disclosure.

The image forming apparatus 100 serving as an image processing apparatus is a multifunction peripheral (MFP) having at least two of copying, printing, scanning, and facsimile functions.

As illustrated in FIG. 1, the image forming apparatus 100 includes a sheet feeder 103, a housing 104, a scanner 101, and an automatic document feeder (ADF) 102.

The image forming apparatus 100 includes a plotter 120 serving as an image forming device inside the housing 104. The plotter 120 includes a tandem image forming unit 105, a registration roller pair 108 that supplies the image forming unit 105 with a recording medium fed by the sheet feeder 103 through a conveyance passage 107, an optical writing device 109, a fixing device 110, and a duplex tray 111.

In the image forming unit 105, four drum-shaped photoconductors 112 are arranged side by side to form toner images of yellow (Y), magenta (M), cyan (C), and black (K), respectively. Note that the black toner is an infrared absorbing visible toner. Each of the four photoconductors 112 is surrounded by various pieces of image forming equipment such as a charger, a developing device 106, a transfer device, a cleaner, and a neutralizer. An intermediate transfer belt 113, entrained around a drive roller and a driven roller, is disposed while being sandwiched between the four photoconductors 112 and the respective transfer devices.

In the tandem image forming apparatus 100 configured as described above, the scanner 101 reads a document image, which is an image of a document fed by the ADF 102, for example. The optical writing device 109 optically writes a latent image on the photoconductor 112 for each color of Y, M, C, and K according to data of the image. The developing device 106 develops the latent image into a toner image for each color. The toner images are primarily transferred onto the intermediate transfer belt 113 in the order of Y, M, C. and K, for example. Specifically, the toner images of the four colors are superimposed one atop another on the intermediate transfer belt 113 in a primary transfer process. Thus, a composite full-color toner image is formed on the intermediate transfer belt 113. Then, in the image forming apparatus 100, the full-color toner image is secondarily transferred onto a recording medium supplied from the sheet feeder 103. Thereafter, the fixing device 110 fixes the full-color toner image onto the recording medium. Finally, the recording medium bearing the fixed toner image is ejected. Thus, the image forming apparatus 100 forms a full-color image on a recording medium.

Figure 2:
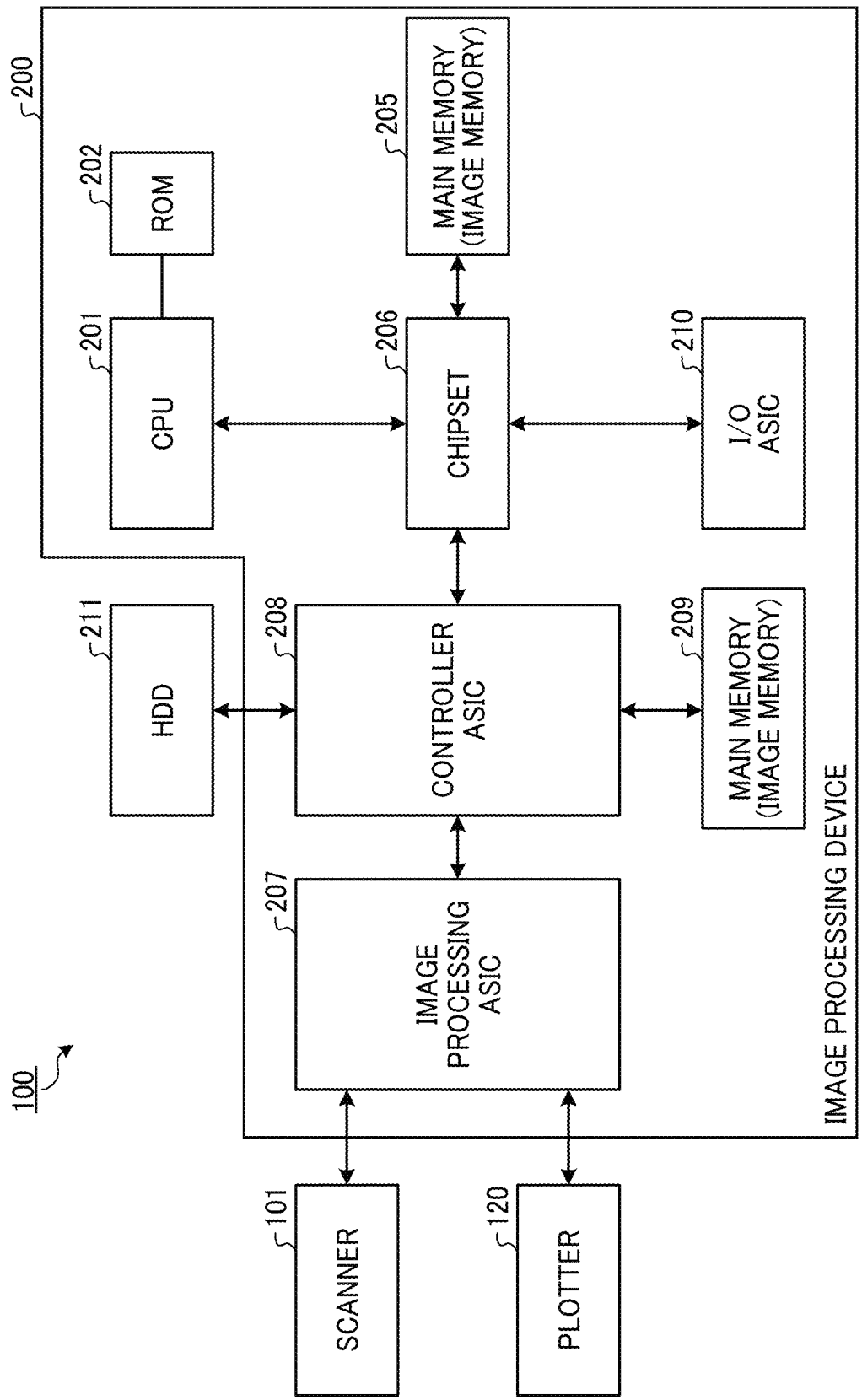
FIG. 2 is a block diagram illustrating a hardware configuration of the image forming apparatus.

Referring now to FIG. 2, a description is given of a hardware configuration of the image forming apparatus 100 described above.

FIG. 2 is a block diagram illustrating a hardware configuration of the image forming apparatus 100.

As illustrated in FIG. 2, the image forming apparatus 100 includes an image processing device 200 that processes a document image read by the scanner 101 and outputs the processed image as image data to the plotter 120. The scanner 101, the ADF 102, and the image processing device 200 construct a tilt correction device and a reading device.

The image processing device 200 includes a central processing unit (CPU) 201, a read only memory (ROM) 202, a main memory 205, a chipset 206, an image processing application specific integrated circuit (ASIC) 207, a controller ASIC 208, a main memory 209, and an input/output (I/O) ASIC 210.

The CPU 201 controls the image forming apparatus 100. The main memory 205 is a memory into which a program is loaded to cause the CPU 201 to control the image forming apparatus 100. The main memory 205 is used as a work area for the CPU 201. The main memory 205 is also used as an image memory to temporarily store image data to be handled. The chipset 206 is used together with the CPU 201 to control an access from the controller ASIC 208 and the I/O ASIC 210 to the main memory 205.

The program executed by the image forming apparatus 100 according to the present embodiment may be stored in a computer-readable storage medium, such as a compact disc read-only memory (CD-ROM), a flexible disk (FD), a compact disc recordable (CD-R), and a digital versatile disk (DVD), in an installable or executable file format, to be provided.

Alternatively, the program executed by the image forming apparatus 100 according to the present embodiment may be stored in a computer connected to a network such as the Internet and downloaded via the network, thus being providable. The program executed by the image forming apparatus 100 according to the present embodiment may be provided or distributed via a network such as the Internet.

The scanner 101 has a function of reading image data to be copied or output to an external interface, for example. The plotter 120 has a function of printing image data stored in the main memory 209.

The image processing ASIC 207 performs image processing on image data read by the scanner 101 and outputs the processed image data to the controller ASIC 208. In addition, the image processing ASIC 207 performs image processing on image data from the controller ASIC 208 to allow the plotter 120 to print the image data. According to print timing of the plotter 120, the image processing ASIC 207 transmits the processed image data to the plotter 120.

The controller ASIC 208 uses the main memory 205 over the chipset 206 to rotate and edit image data handled by the image forming apparatus 100. The controller ASIC 208 stores the image data in a hard disk drive (HDD) 211. The controller ASIC 208 transmits and receives the image data to and from the image processing ASIC 207. The main memory 209 is used as an image memory with which the controller ASIC 208 performs image processing. The HDD 211 is used to temporarily store processed image data.

The I/O ASIC 210 is an external interface that gives an additional function to the image forming apparatus 100. For example, the I/O ASIC 210 includes interfaces such as a network interface, a universal serial bus (USB), a secure digital (SD) card, an operation unit, a serial peripheral interface (SPI), an inter-integrated circuit (I2C), and a document width sensor (or width detection sensor) interfaces, a hardware accelerator that accelerates image processing, and an encryption processing circuit.

Figure 3:
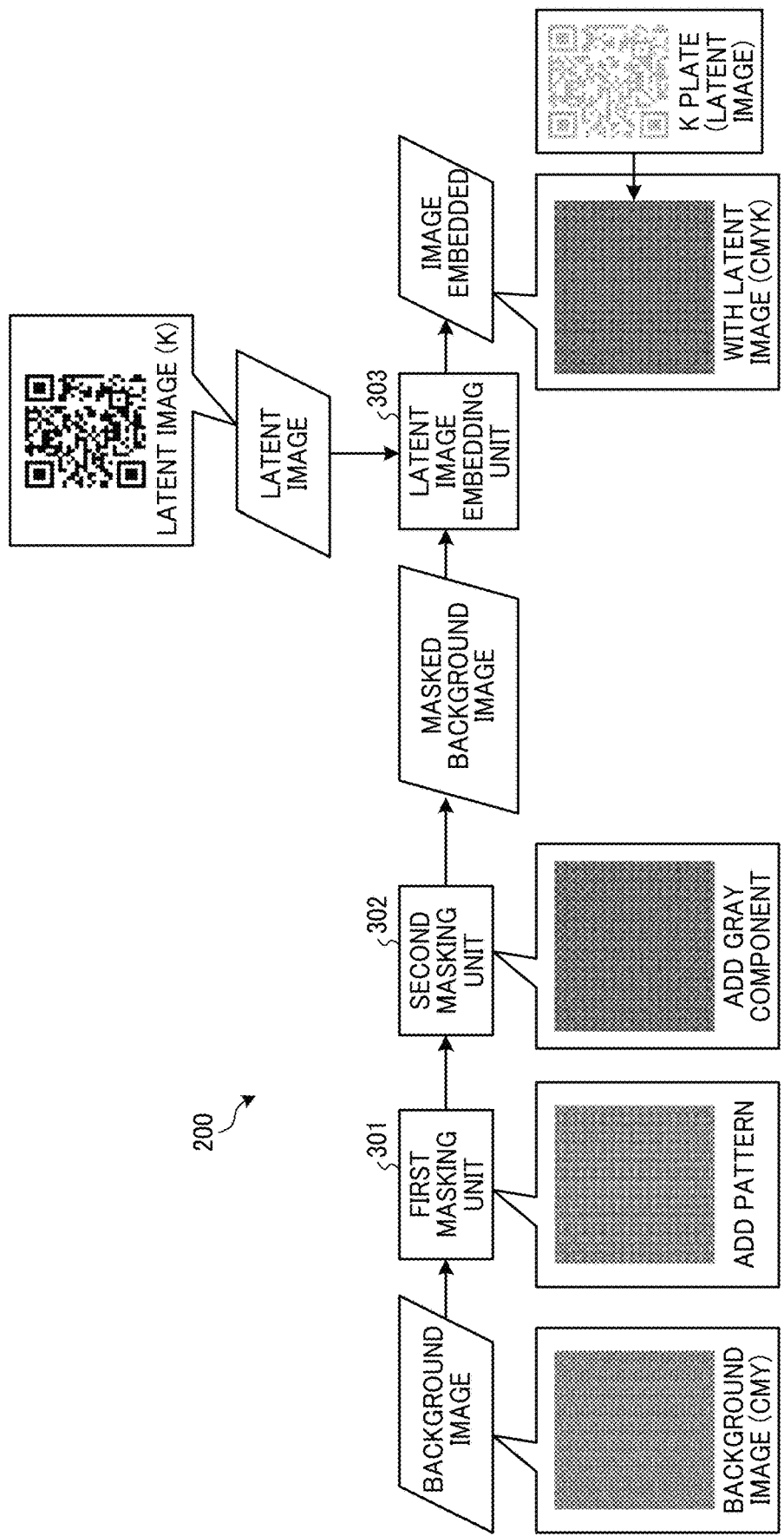
FIG. 3 is a functional block diagram of an image processing device according to a first embodiment of the present disclosure.

Referring now to FIG. 3, a description is given of functions exerted by the image processing device 200.

FIG. 3 is a functional block diagram of the image processing device 200 according to the first embodiment of the present disclosure.

Note that a description is herein given of characteristic functions of the present embodiment among the functions exerted by the image processing device 200.

The image processing device 200 generally has a function of generating an image embedded with a latent image with four colorants including a black colorant exhibiting an infrared absorption characteristic and cyan, magenta, and yellow colorants each exhibiting an infrared transmission characteristic, by taking advantages of a color-matching masking effect and a visual masking effect that compensates for a defect of the color-matching masking effect in a mutually complementary manner. The plotter 120 prints the generated image that is embedded with the latent image, thereby producing a printed matter including an infrared latent image.

The infrared latent image herein refers to image information that is difficult to be visually recognized under visible light and detectable simply by a sensing device having a reaction in infrared. An image embedded with a latent image described below refers to an image in which invisible information including an infrared latent image is embedded. A background image described below represents a visible image into which a latent image is embedded. When an image embedded with a latent image is viewed, the background image is viewed alone. A latent image described below refers to image information that is embedded as invisible information into the background image.

A masking effect refers to a physical mask effect to conceal a latent image. Masking refers to image processing applied to a background to obtain the masking effect.

As illustrated in FIG. 3, the image processing device 200 includes a first masking unit 301, a second masking unit 302, and a latent image embedding unit 303.

The first masking unit 301 serving as an auxiliary masking unit performs a first masking process to conceal a latent image. The first masking process refers to a process of changing a density change characteristic between pixels in an image to obtain a visual masking effect to conceal the latent image. The first masking process is herein referred to as a visual masking process.

In other words, the first masking unit 301 serving as an auxiliary masking unit is configured to process a background image into which a latent image is embedded, to obtain an effect to conceal the latent image. The first masking unit 301 is configured to change a density change characteristic between pixels in the background image to obtain a visual masking effect to conceal the latent image.

In general, changes in density such as noise are easily noticed with respect to a flat portion having little density change of an image. By contrast, the changes in density such as noise are hardly noticed with respect to a portion having a great density change, because the changes in density are confused with surrounding density differences. Such a human sensing characteristic is called a visual masking effect.

Figure 26:
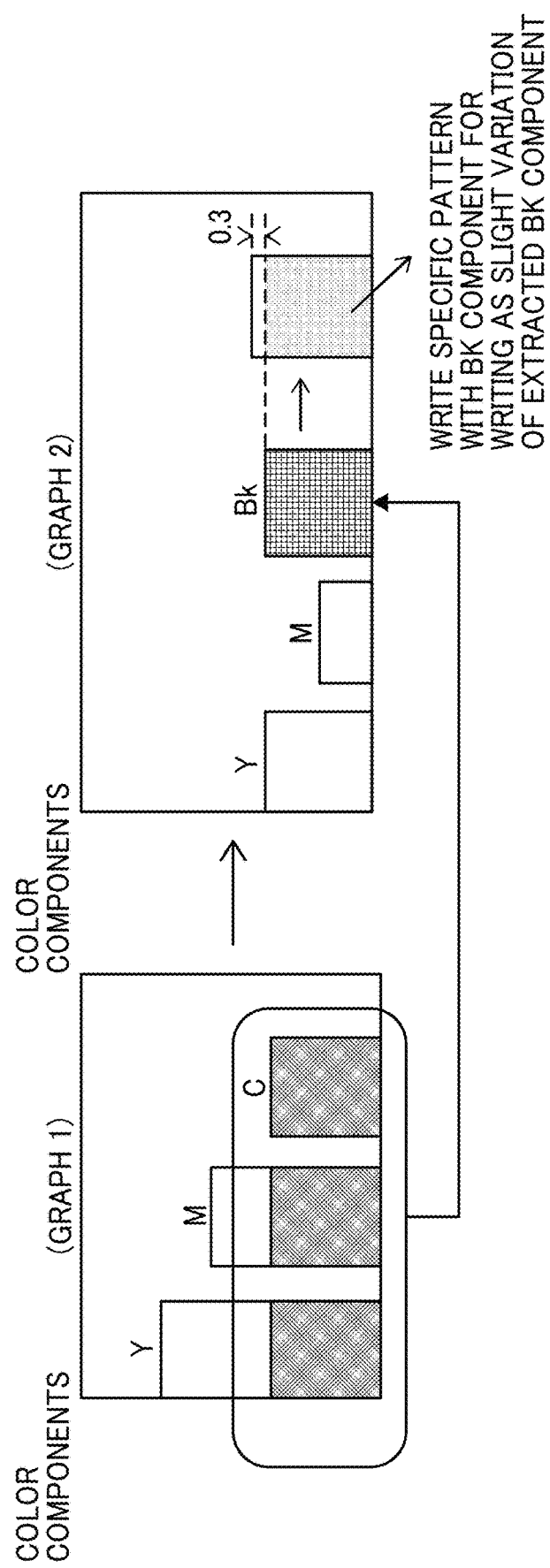
FIG. 26 is a diagram illustrating a related-art way in which a specific pattern writing unit separates a background color of image information to extract color components and determines an appropriate density based on the extracted color components.

FIG. 26 is a diagram illustrating a way disclosed in JP-H07-319347-A, in which a specific pattern writing unit separates a background color of image information to extract color components and determines an appropriate density based on the extracted color components.

As illustrated in graph 1 of FIG. 26, the specific pattern writing unit separates the background color of the image information received from a scanner into YMC color components and extracts a black component (hatched by diagonal lines in graph 1 of FIG. 26). According to a first embodiment of JP-H07-319347-A, the specific pattern writing unit separates the background color of the image information to extract the color components and determines an appropriate density based on the extracted color components. Accordingly, a specific pattern is added in an inconspicuous manner without deteriorating the color reproducibility of a copy. In addition, the detection accuracy is increased to reliably track the copy.

In the embodiment of an infrared pattern using the metamerism as in the aforementioned technique disclosed in JP-H07-319347-A, color matching conditions change due to changes in the illumination environment or changes in density of an image forming apparatus. Accordingly, a visual difference occurs between a portion embedded with a latent image and a portion not embedded with the latent image. Therefore, an advantage of the visual masking effect is to be taken to conceal the latent image.

In order to take the advantage of the visual masking effect, the first masking unit 301 synthesizes a specific masking pattern and a background image into which a latent image is embedded, so as to prevent visualization of the latent image.

Figure 4:
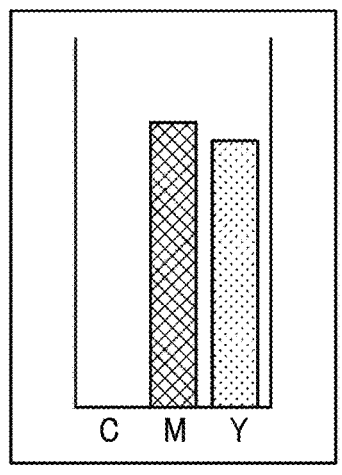
FIG. 4 is a diagram illustrating a background image into which a latent image is embedded.

FIG. 4 is a diagram illustrating an example of the background image, as a target background image, into which a latent image is embedded.

As illustrated in FIG. 4, the target background image is not a gray image entirely constructed of cyan, magenta, and yellow. As a background color component of the target background image, a reddish color represented by magenta and yellow values is used. That is, the target background image does not include a cyan component. In other words, the target background image is formed with colors that do not include a gray component.

Figure 5:
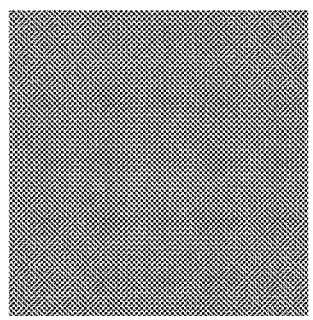
FIG. 5 is a diagram illustrating a first masking process.
Figure 5:
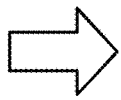
Figure 5:
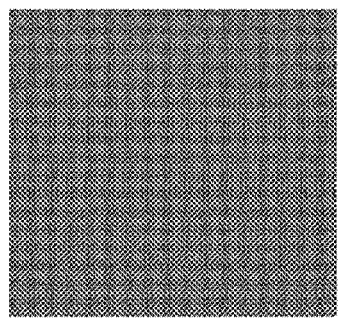
Figure 5:
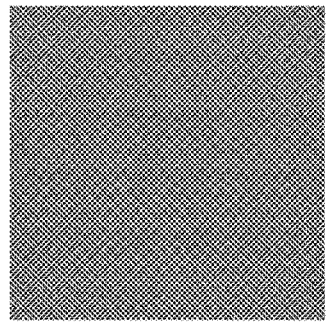

FIG. 5 is a diagram illustrating an example of the first masking process.

As illustrated in FIG. 5, a grid waveform is an example of a specific masking pattern. The first masking unit 301 synthesizes the specific masking pattern and a target background image into which a latent image is embedded.

Note that, in order to increase the visual masking effect, the pattern type and intensity is desirably changed according to the spatial frequency characteristics of the background image and the latent image. For example, a user or an administrator may select any pattern type and intensity from a plurality of pattern types and intensities. In addition to the changes to pattern, aperiodic noise may be added. A detailed description is deferred of how to select and adjust the pattern.

The second masking unit 302 serving as a color-matching masking unit performs a second masking process to conceal a latent image. The second masking process refers to a process of performing color conversion to enhance a color-matching masking effect to conceal a latent image. The second masking process is herein referred to as a color-matching masking process. The color-matching masking effect is defined as an effect of concealing a latent image in a background by taking an advantage of a masking effect from the metamerism. In other words, the second masking unit 302 serving as a color-matching masking unit is configured to perform color conversion of the background image to obtain a color-matching masking effect to conceal the latent image.

Figure 6:
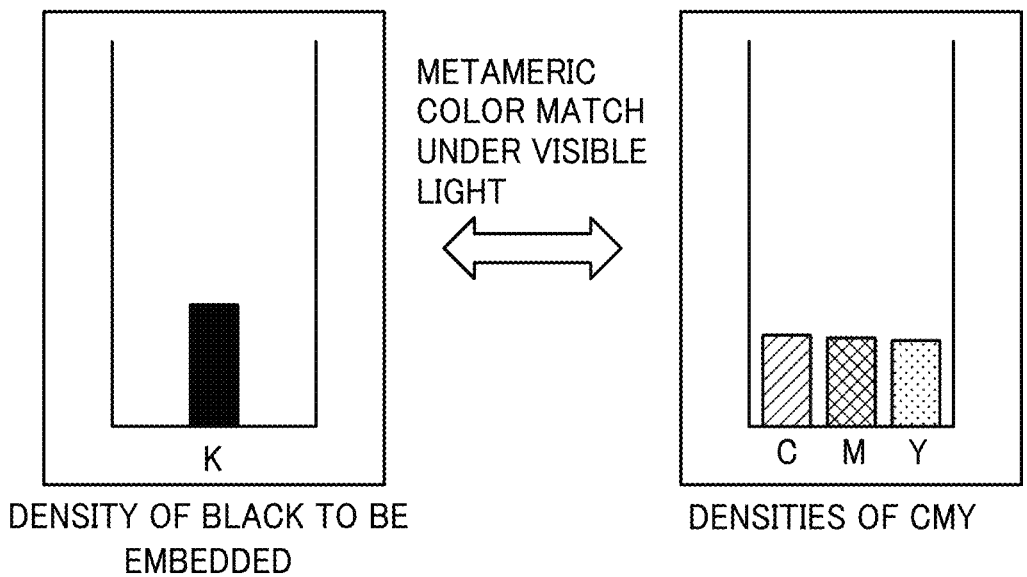
FIG. 6 is a diagram illustrating a relationship between a density of black to be embedded and cyan, magenta, and yellow amounts (or densities) to be added.

FIG. 6 is a diagram illustrating a relationship between a density of black to be embedded and cyan, magenta, and yellow (CMY) amounts (or densities) to be added.

Embedding an infrared pattern using black toner as in the technique disclosed in JP-H07-319347-A uses a gray component (i.e., CMY components) corresponding to the density of the black to be embedded as illustrated in FIG. 6. In a case in which the gray component corresponding to the density of the black to be embedded is absent, the color tones do not metamerically match before and after the CMY-to-CMYK conversion, rendering the latent image visible.

Figure 7:
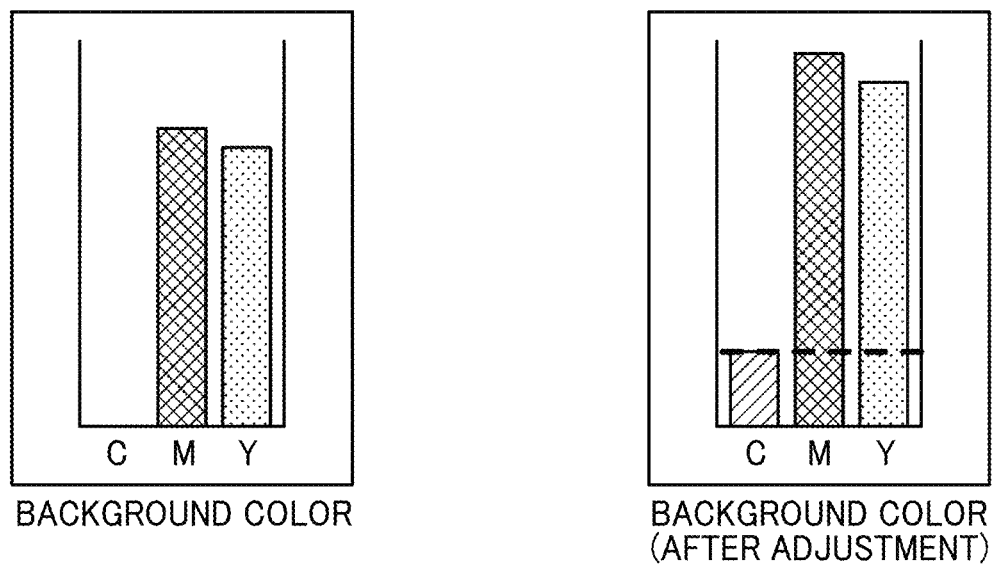
FIG. 7 is a diagram illustrating a second masking process.

FIG. 7 is a diagram illustrating an example of the second masking process. As illustrated in FIG. 7, the second masking unit 302 adds the gray component corresponding to a density value of the black to be embedded, to attain a metameric color match before and after an embedding process. In other words, the second masking unit 302 serving as a color-matching masking unit is configured to add a gray component as color conversion of a background image.

Note that, as the CMY amounts added by the second masking unit 302, the CMY values are desirably used that metamerically match black having a predetermined density and used for embedment.

With such a color adjustment, a masking effect is obtained taking an advantage of the metamerism even for a background image of any color.

Figure 8:
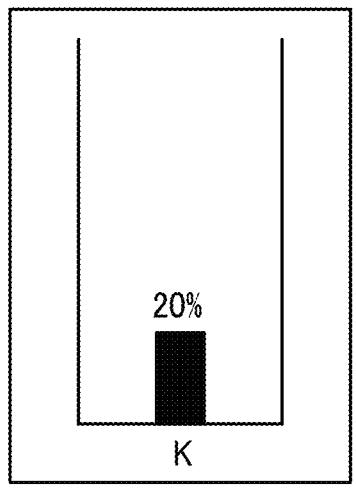
FIG. 8 is a diagram illustrating an amount of gray added in a color-matching masking process.
Figure 8:
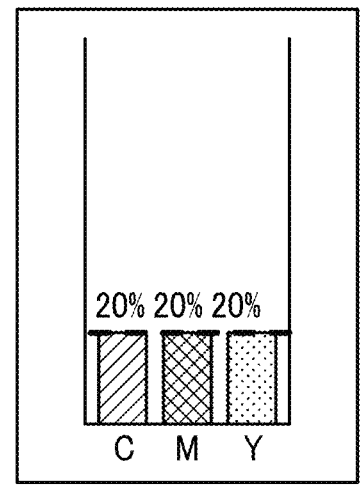
Figure 8:
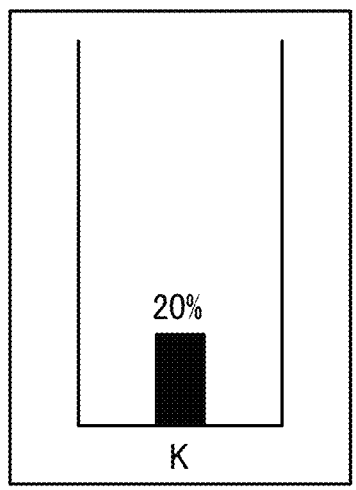
Figure 8:
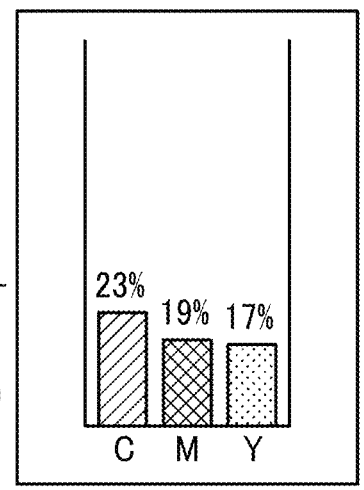

Referring now to FIGS. 8 and 9, a detailed description is given of how to determine a gray component to be added in the color-matching masking process performed by the second masking unit 302.

FIG. 8 is a diagram illustrating an amount of gray added in the color-matching masking process. FIG. 9 is a reference table illustrating a relationship between an amount of black to be embedded and corresponding print amounts of CMY-gray, that is, cyan, magenta, and yellow (CMY) that generate gray.

FIG. 6 illustrates CMY-gray as a metamer of K-gray. Note that the CMY-gray is generated by printing C, M, and Y in equal amount. The K-gray is generated by K component. Since the combination of CMY as a metamer of the K-gray differs depending on the characteristics of colorants used in the image forming apparatus 100, the combination of CMY is preferably determined according to the characteristic of the image forming apparatus 100. In other words, the conditions for metamerism depend on the characteristics of printing devices.

As an example of the combination of CMY, FIG. 8 illustrates 3C gray as a metamer of the K-gray in the image forming apparatus 100. As illustrated in FIG. 8, when K=20%, appropriate percentages of C, M, and Y are 23%, 19%, and 17%, respectively, to generate the 3C gray as a metamer of the K-gray under a D50 light source. Note that the K-gray does not metamerically match a gray generated by C=20%, M=20%, and Y=20%.

In the color-matching masking process, the second masking unit 302 preferably adds C=23%, M=19%, and Y=17% as an amount of gray, in a case in which a latent image is formed with a maximum print amount of K=20%. By adding, to an entire image, the CMY amounts corresponding to the maximum print amount of K used for embedment, the color-matching masking process can be performed on any background color.

FIG. 9 illustrates a metameric relationship between various print amounts of K and the respective print amounts of C, M, and Y in the image forming apparatus 100. Retaining the CMY amounts corresponding to the print amount of K as a reference table as illustrated in FIG. 9 allows determination of an amount of gray to be added appropriate for a variable density of a latent image to be embedded. Note that, in the present embodiment, the reference table illustrated in FIG. 9 is used for adding gray. Alternatively, the reference table may be used for adding K and reducing C, M, and Y.

As described above, the amount of gray to be added is automatically determined with reference to the table illustrated in FIG. 9. Alternatively, for example, a user may adjust the amount of gray to be added, in consideration of the design or designability. For example, a user who is concerned about the graying of a background rather than the stealth may not necessarily add the gray component corresponding to the maximum density. For example, in a case in which a latent image is embedded at a density of K=40% at maximum, a gray component corresponding to K=20% may be added, placing importance on the designability. In a case in which a latent image corresponding to a maximum density of K=20% is embedded and importance is placed on the stealth, a gray component corresponding to K=40% may be added to a background image. In other words, the second masking unit 302 serving as a color-matching masking unit is configured to determine the gray component according to a density of the latent image. Alternatively, the gray component may be manually adjustable by, e.g., a user.

As described above, in an infrared embedding pattern using a visible black toner, one type of masking effect is insufficient to conceal a latent image. To sufficiently conceal a latent image, in the present embodiment, masking processes are performed in combination, such as the first masking process to obtain a visual masking effect and the second masking process to obtain a masking effect from the metamerism.

The first masking unit 301 and the second masking unit 302 generate a masked background image subjected to the first masking process and the second masking process to conceal a latent image with enhanced confidentiality.

Referring back to FIG. 3, the latent image embedding unit 303 performs a latent image synthesizing process of embedding a designated latent image in the masked background image generated by the first masking unit 301 and the second masking unit 302 to generate an image embedded with the latent image. In other words, the latent image embedding unit 303 is configured to embed the latent image in the background image processed by the first masking unit 301 serving as an auxiliary masking unit and converted by the second masking unit 302 serving as a color-matching masking unit, to generate an image embedded with the latent image. Note that the latent image information is preferably image information designated with the K plane. The latent image embedding unit 303 changes an amount of generation of a black component according to the pixel value of the latent image, thereby embedding the latent image.

Figure 10:
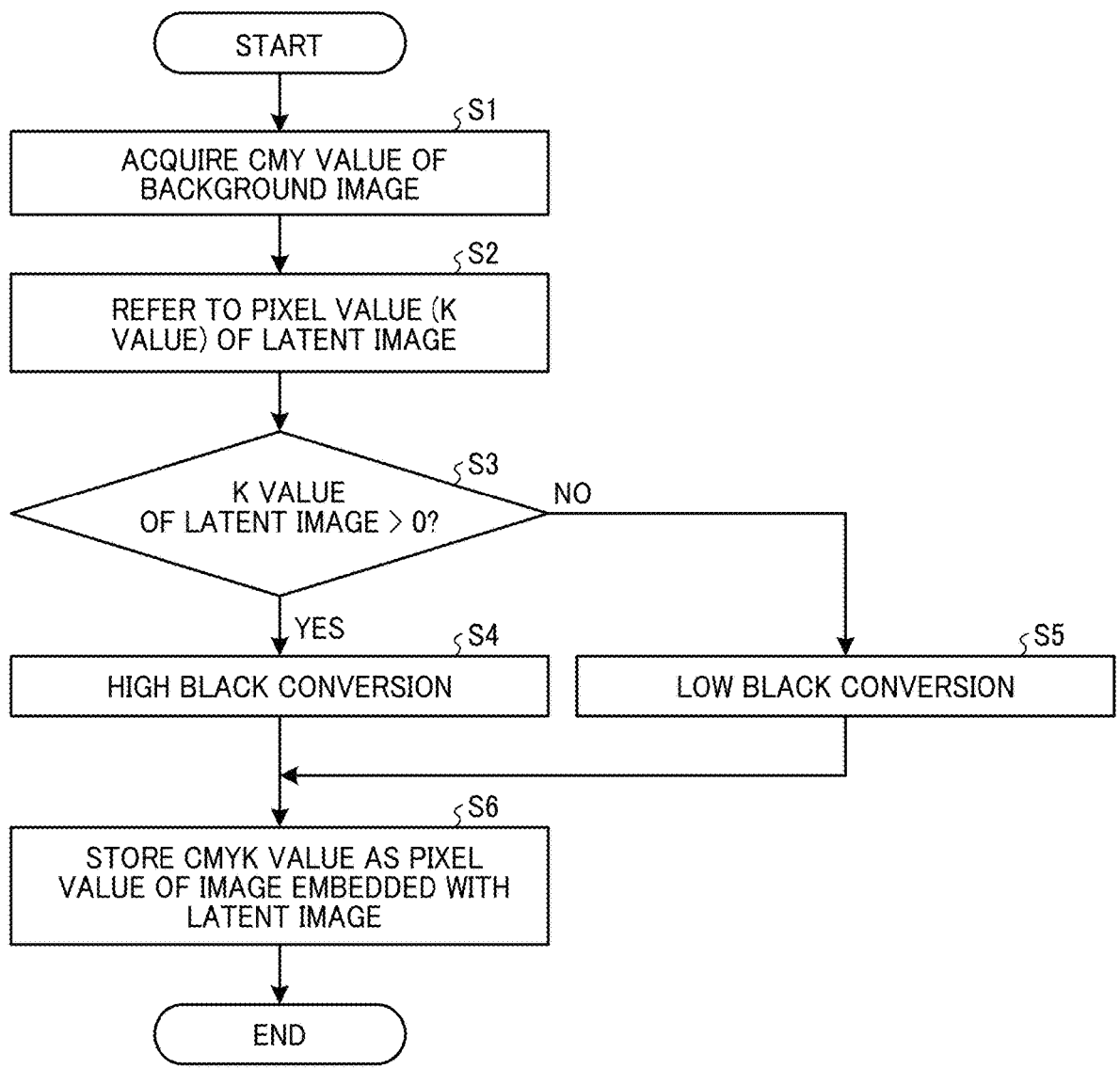
FIG. 10 is a schematic flowchart of a latent image embedding process.

Referring now to FIG. 10, a description is given of a flow of a latent image embedding process performed by the latent image embedding unit 303.

FIG. 10 is a schematic flowchart of the latent image embedding process.

In the latent image embedding process, which is also referred to as a latent image synthesizing process, illustrated in FIG. 10, the latent image embedding unit 303 performs the following process on all pixel values in a masked background image.

As illustrated in FIG. 10, in step S1, the latent image embedding unit 303 acquires a pixel value (as a CMY value) of the masked background image generated by the first masking unit 301 and the second masking unit 302.

Subsequently in step S2, the latent image embedding unit 303 refers to a pixel value of a latent image at a pixel position identical to a position of a reference pixel of the masked background image. In the present example, the latent image embedding unit 303 refers to K-plate information (i.e., K value) as the latent image is formed by the K plate. In addition, the latent image is binarized.

Subsequently in step S3, the latent image embedding unit 303 determines whether the pixel value (i.e., K value) of the latent image is greater than 0 (i.e., K>0).

When the latent image embedding unit 303 determines that the pixel value (i.e., K value) of the latent image is greater than 0 (YES in step S3), that is, when the pixel is a black pixel, the latent image embedding unit 303 performs high black conversion to replace the CMY value with K in step S4. Note that decreased CMY amounts are adjusted in the CMY-to-CMYK conversion such that the color tone (e.g., Lab) does not theoretically change under visible light at the time of conversion, in other words, such that the color tone before conversion and the color tone after conversion metamerically match.

On the other hand, when the latent image embedding unit 303 determines that the pixel value (i.e., K value) is not greater than 0 (NO in step S3), specifically, when the pixel value is 0 (i.e., K=0), the latent image embedding unit 303 does not generate K, leaving the CMY value unchanged in step S5. Alternatively, the latent image embedding unit 303 may perform low black conversion to generate K in less amount than the amount of K generated when the pixel value (i.e., K value) of the latent image is greater than 0. Note that, even in a case in which the latent image embedding unit 303 performs the low black conversion, the CMY-to-CMYK conversion is adjusted such that the color tones metamerically match before and after the conversion.

In step S6, the latent image embedding unit 303 newly stores the CMYK amount (i.e., CMYK value) generated in step S4 or step S5 as a pixel value of an image embedded with the latent image.

The latent image embedding unit 303 repeats the processing of steps S1 to S6 on all the pixels of the masked background image to generate a new image embedded with the latent image. Since the color tone is herein adjusted not to change under visible light at the time of CMY-to-CMYK conversion, the image embedded with the latent image and the masked background image do not change visually when the images are output. However, in the image embedded with the latent image, the generated amount of K differs for each pixel depending on the pixel values of the latent image.

Figure 11A:
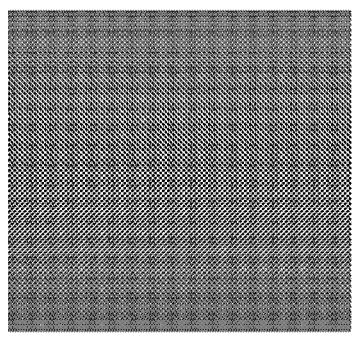
FIG. 11A is a diagram illustrating a latent image and an image embedded with the latent image.
Figure 11A:
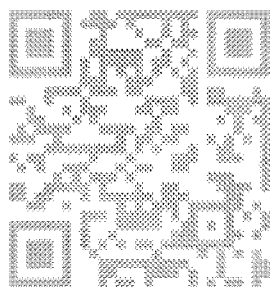
Figure 11B:
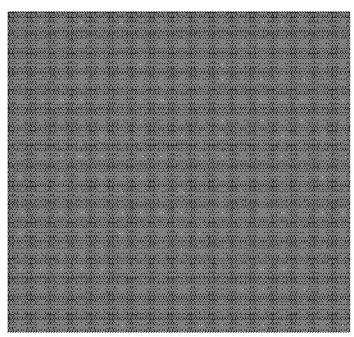
FIG. 11B is a diagram illustrating a difference between a visible image and an infrared image of the printed image embedded with the latent image.
Figure 11B:
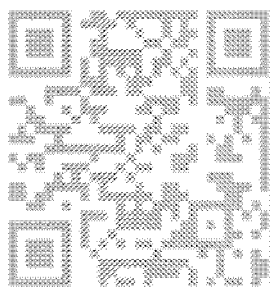

FIGS. 11A and 11B illustrate a difference between a visual image and an infrared image of a printed matter produced by printing an infrared latent image generated by the image processing device 200. Specifically, FIG. 11A is a diagram illustrating a latent image and an image embedded with the latent image. FIG. 11B is a diagram illustrating the difference between the visual image and the infrared image of the printed image embedded with the latent image.

More specifically, FIG. 11A illustrates an example in which a binary image storing a Quick Response (QR) code (registered trademark) is embedded as a latent image in a uniform background image subjected to the first masking process and the second masking process.

In the image embedded with the latent image, K is generated according to the characteristic amount of the QR code as illustrated in FIG. 11A. When the image forming apparatus 100 prints the image embedded with the latent image with CMYK toners to faithfully reproduce the pixel values of the image embedded with the latent image, the masked background image is viewed as illustrated in FIG. 11B.

On the other hand, through an infrared sensing device, CMY toners are transparent because the CMY toners have a transmission characteristic; whereas K toner appears black because the K toner has an absorption characteristic. Therefore, the QR code embedded as a latent image can be confirmed with the infrared sensing device.

As described above, in the color-matching masking process as the second masking process according to the present embodiment, color tones of a background image metamerically match before and after the CMY-to-CMYK conversion is performed to embed a latent image in the background image, even in a case in which the background image does not include a gray component and therefore the technique disclosed in JP-H07-319347-A fails to satisfy the metamerism. Thus, in the present embodiment, the color-matching masking effect prevents visualization of the latent image.

In addition, the visual masking process as the first masking process generates a change in shading in the background image, which is originally in a uniform color. Thus, the visual masking process provides a visual masking effect. Accordingly, even in a case in which the conditions for metamerism change due to density fluctuations or changes in viewing circumstance, the present embodiment prevents visualization of the latent image.

Further, in the present embodiment, the color-matching masking process is performed after the visual masking process. In a case in which the visual masking process is performed after the color-matching process, changes in shading resulting from the visual masking process may cause the conditions for metamerism collapse. To address such a situation, the color-matching masking process is performed after the visual masking process in the present embodiment. In addition, in combination with any other masking processes, the color-matching masking process is desirably performed as a last process.

Figure 12A:
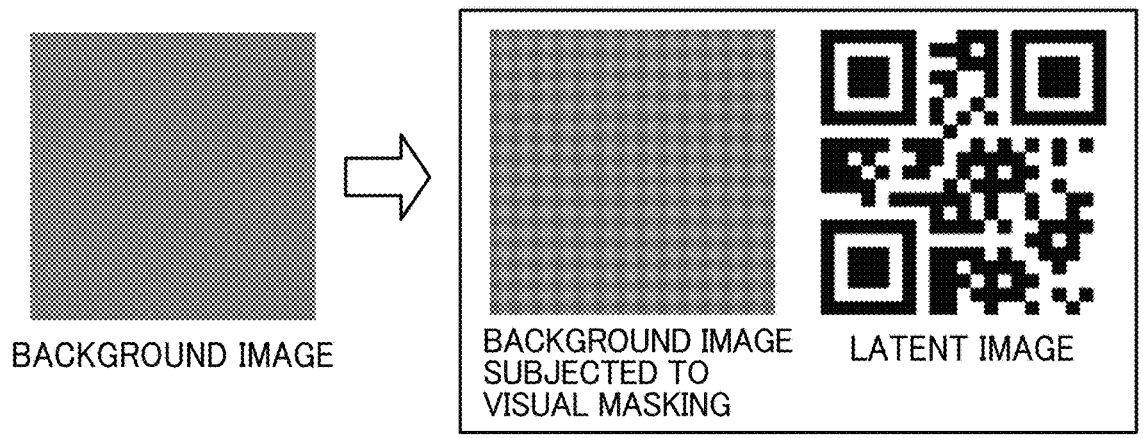
FIG. 12A is a diagram illustrating a first example of a mask pattern selected according to an attribute of a latent image.
Figure 12B:
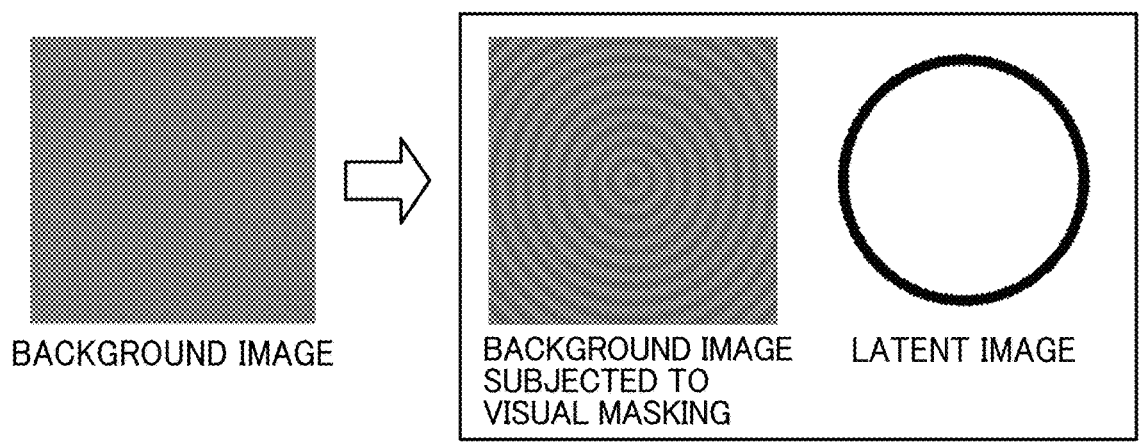
FIG. 12B is a diagram illustrating a second example of the mask pattern selected according to an attribute of another latent image.
Figure 12C:
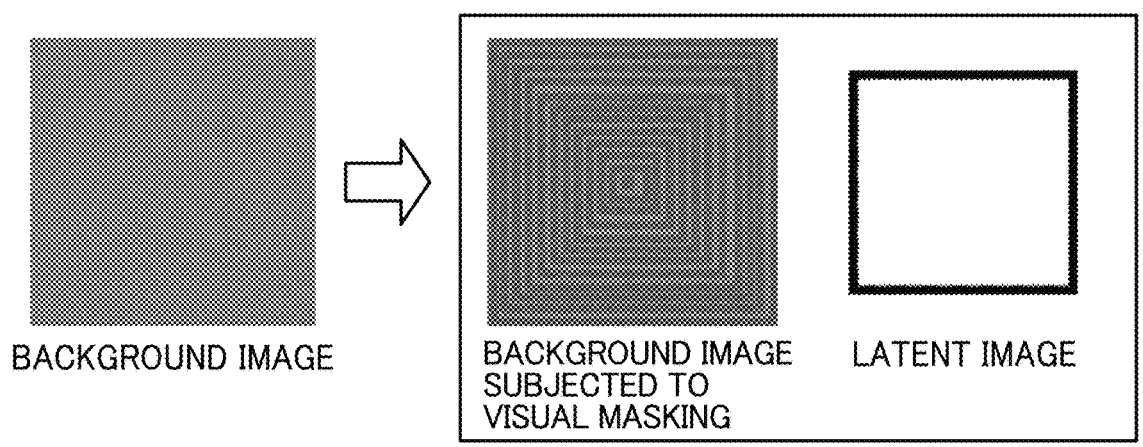
FIG. 12C is a diagram illustrating a third example of the mask pattern selected according to an attribute of yet another latent image.

Referring now to FIGS. 12A to 12C, a description is given of how to select a mask pattern (or spatial pattern) to be added in the visual masking process according to an attribute of a latent image.

FIGS. 12A to 12C illustrate some examples of a mask pattern selected according to attributes of latent images. FIG. 12A is a diagram illustrating a first example of the mask pattern selected according to an attribute of a latent image. FIG. 12B is a diagram illustrating a second example of the mask pattern selected according to an attribute of another latent image. FIG. 12C is a diagram illustrating a third example of the mask pattern selected according to an attribute of yet another latent image.

Specifically, FIGS. 12A to 12C illustrate different types of mask pattern to be added, according to the attributes of the latent images. In other words, the first masking unit 301 serving as an auxiliary masking unit is configured to synthesize a spatial pattern and a background image into which a latent image is embedded. The first masking unit 301 is configured to select one type of the spatial pattern from a plurality of types of the spatial pattern according to an attribute of the latent image. One approach to concealing a latent image involves a mask pattern having a characteristic similar to a typical characteristic of the latent image, because such a mask pattern makes it difficult to visually distinguish between the mask pattern and the latent image and prevents visualization of the latent image.

Specifically, FIG. 12A illustrates a mask pattern suitable for embedding a QR code as a latent image. In a case in which a latent image having a two-dimensional grid pattern such as a QR code is used, a mask pattern in a grid waveform is desirably used in which the positional information (X, Y) of the image is indicative of the phase information. In other words, the spatial pattern is a grid pattern having coordinate information as phase information.

FIG. 12B illustrates a mask pattern suitable for embedding a circular mark as a latent image. In general, typical graphic shapes such as circles, triangles, and quadrangles remain as memory shapes in the human brain and are easily recognized. Therefore, a slight change in density of a latent image in such a shape may facilitate visual recognition of the latent image. To address such a situation, in a case in which a latent image has a graphic shape such as a circle, a triangle, or a quadrangle, it is desirable to embed a mask pattern having an attribute close to the graphic shape of the latent image. FIG. 12B illustrates a spherical wave pattern to be added as a visual masking pattern so as to prevent visualization of the circular mark. In other words, the spatial pattern is a spherical wave pattern having a distance from a specific position as phase information. The distance from a specific position is, e.g., a distance from an image center as illustrated in FIG. 13.

Figure 13:
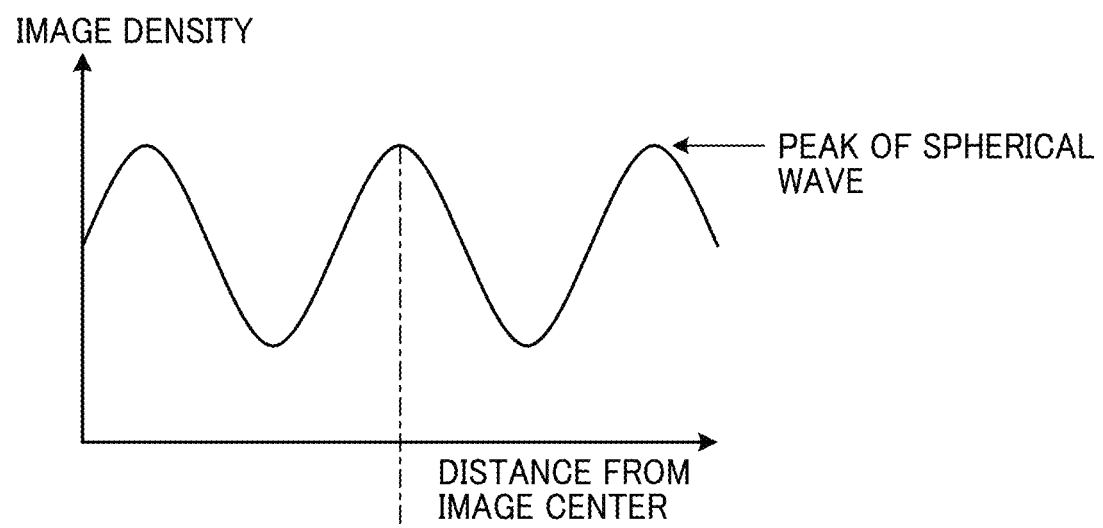
FIG. 13 is a graph illustrating how to adjust the phase of a mask pattern.
Figure 13:
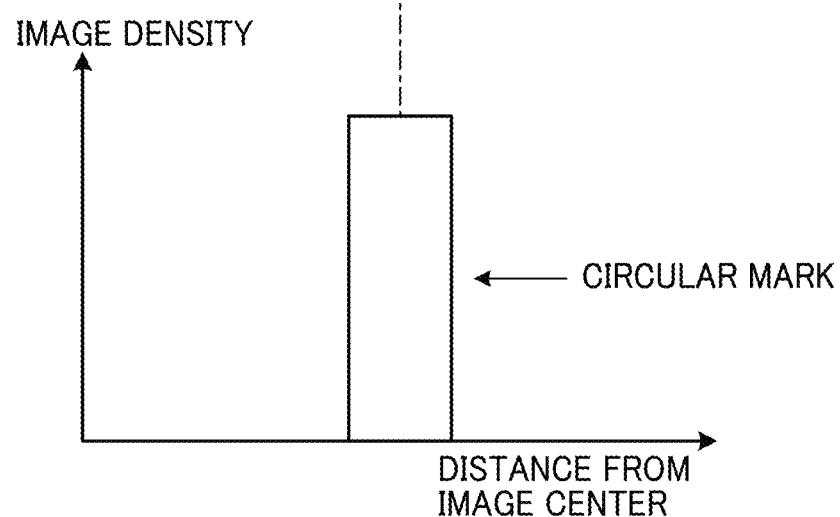

FIG. 13 is a graph illustrating how to adjust the phase of a mask pattern.

As illustrated in FIG. 13, the phase of the mask pattern is adjusted so as to superimpose a peak of the spherical wave increased in density atop a black portion of the circular mark. As a consequence, even in a case in which the circular portion becomes visible due to density fluctuations or changes in viewing circumstance, the circular portion is visually mixed with the spherical wave that causes the density fluctuations. Thus, the present example further reduces the visibility of the latent image and enhances the stealth.

FIG. 12C illustrates a wave-front pattern in which a square wave radially spreads from the center, as a mask pattern for visual masking to conceal a quadrangular latent image. In other words, the spatial pattern is a quadrangular or rectangular wave pattern. As in the case of the spherical wave illustrated in FIG. 13, a peak of the wave front is superimposed atop the quadrangular latent image to prevent visualization of the latent image.

Figure 14A:
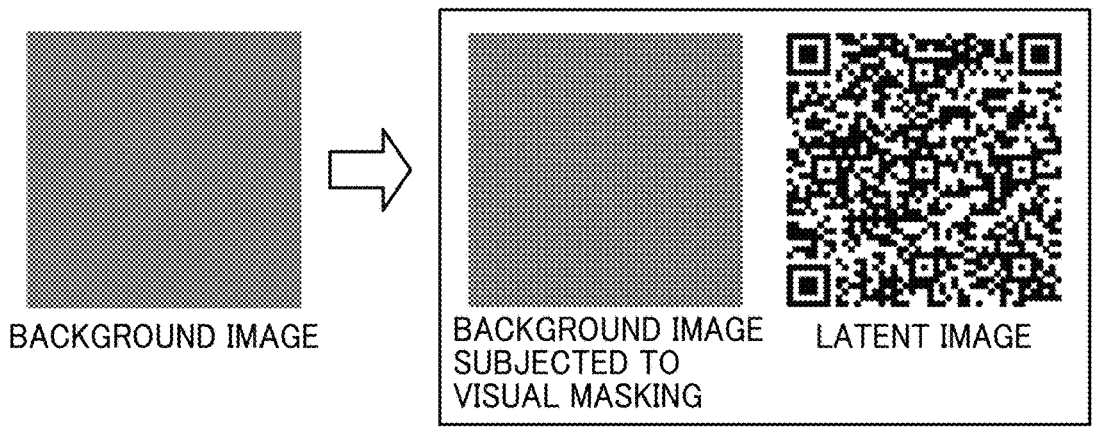
FIG. 14A is a diagram illustrating a first frequency example of a mask pattern selected according to an attribute of a latent image.
Figure 14B:
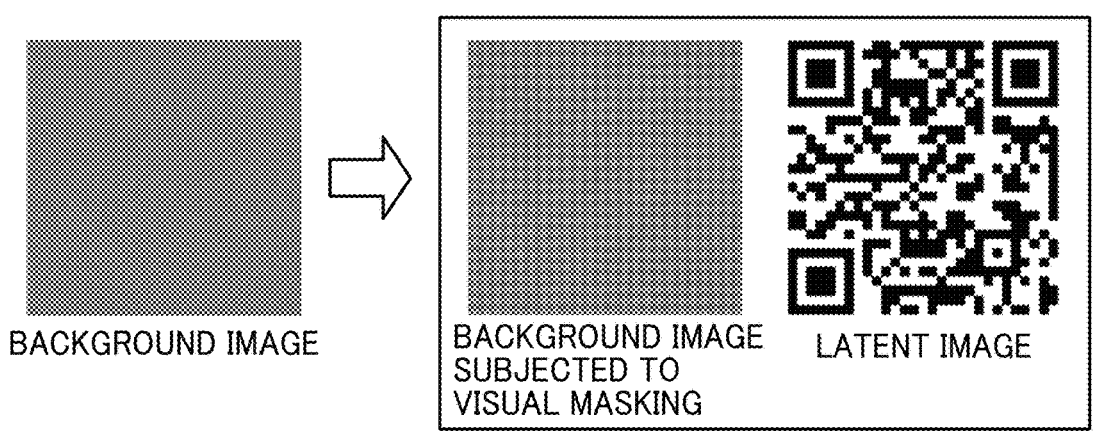
FIG. 14B is a diagram illustrating a second frequency example of the mask pattern selected according to an attribute of another latent image.
Figure 14C:
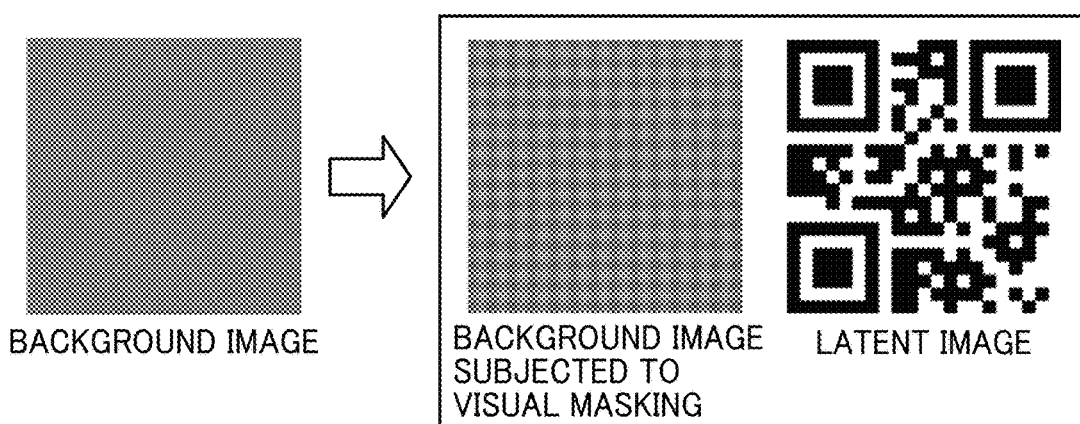
FIG. 14C is a diagram illustrating a third frequency example of the mask pattern selected according to an attribute of yet another latent image.

FIGS. 14A to 14C illustrate some frequency examples of a mask pattern selected according to attributes of latent images. FIG. 14A is a diagram illustrating a first frequency example of a mask pattern selected according to an attribute of a latent image. FIG. 14B is a diagram illustrating a second frequency example of the mask pattern selected according to an attribute of another latent image. FIG. 14C is a diagram illustrating a third frequency example of the mask pattern selected according to an attribute of yet another latent image.

In other words, FIGS. 14A to 14C illustrate how to adjust the cycle of a visual mask pattern in a case in which a QR code is embedded as a latent image.

In FIG. 14A, a code having a relatively small minimum cell and a relatively high spatial frequency is synthesized with a dense pattern having a relatively high spatial frequency as a visual mask pattern.

On the other hand, in FIG. 14C, a code having a relatively large minimum cell and a relatively low spatial frequency is synthesized with a pattern having a relatively low frequency as a visual mask pattern.

Note that the density cycle of the visual mask pattern is preferably matched with a print cycle of the cell size of the QR code. This is because signals having closer spatial frequencies are harder for humans to separately recognize as different signals, thus effectively preventing visualization of the latent image.

Note that a computer may automatically select the type of spatial pattern and adjust the phase based on an attribute of a background image as described above. Alternatively, a user, for example, may manually select the type of spatial pattern and adjust the phase with reference to the aforementioned rules relative to the latent image. In other words, the first masking unit 301 serving as an auxiliary masking unit is configured to determine one of a period and amplitude information of the spatial pattern according to an attribute of the latent image. Alternatively, one of a period and amplitude information of the spatial pattern may be manually changeable by, e.g., a user.

A spatial pattern synthesized with a background image as described above provides a visual masking effect, even in a case in which the background image is a flat image without a portion having great density fluctuations and hampers visual masking.

Figure 15:
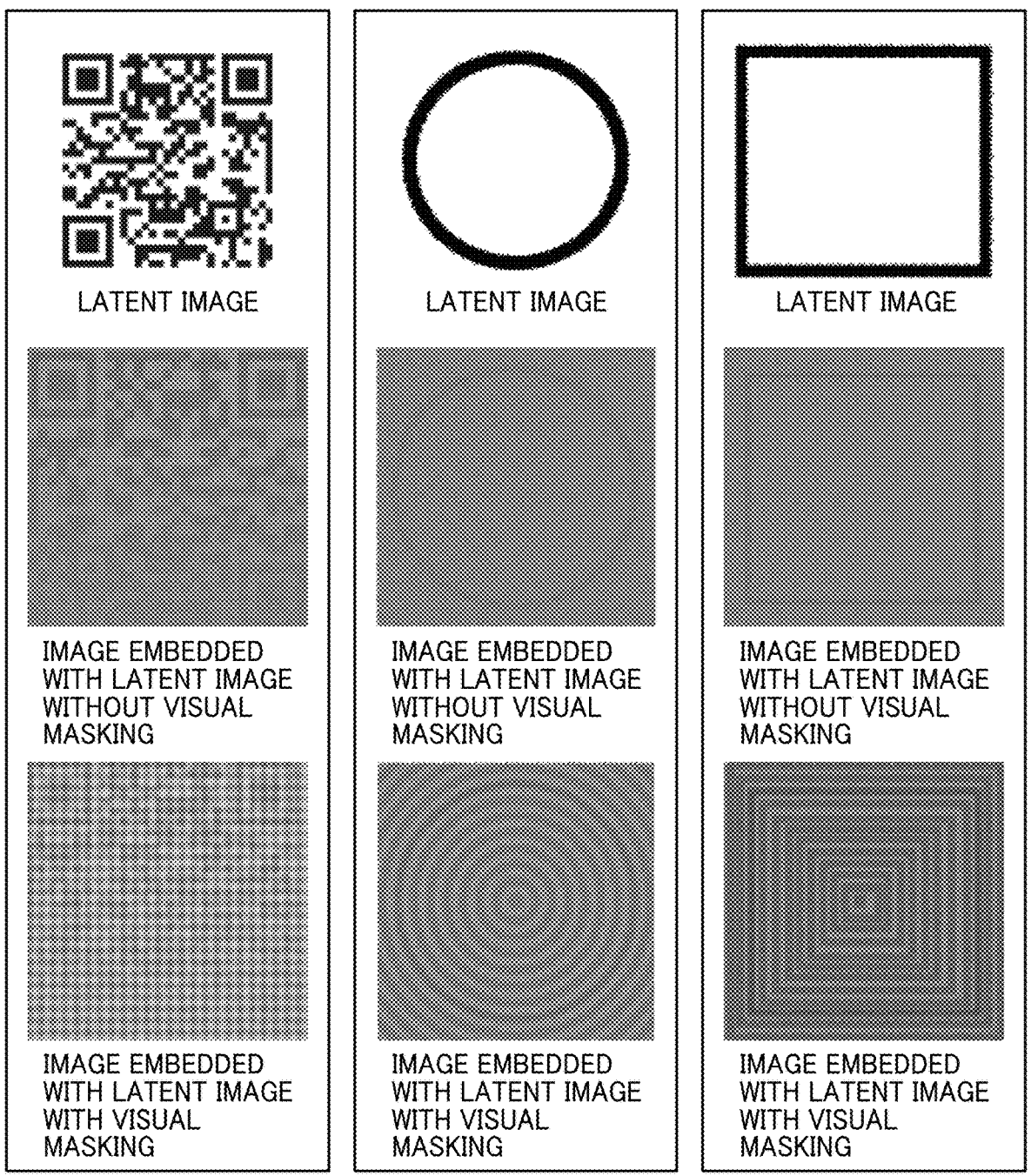
FIG. 15 is a diagram illustrating some examples of effects resulting from visual masking.

FIG. 15 is a diagram illustrating some examples of effects resulting from visual masking.

Specifically, FIG. 15 illustrates latent images in the upper row and images embedded with latent images in the middle and lower rows. Specifically, FIG. 15 illustrates, in the middle row, the images in which the latent images in the upper row are embedded in uniform background images, respectively. FIG. 15 illustrates, in the lower row, the images in which the latent images in the upper row are embedded in the background images to which visual masking patterns are added, respectively.

More specifically, in the middle row of FIG. 15, the latent images are visualized on the uniform background images, respectively, because the conditions for metamerism are not satisfied at the time of image formation due to changes in viewing circumstance or the density fluctuations of device.

By contrast, as illustrated in the lower row of FIG. 15, visualization of the latent images is prevented on the background images embedded with the visual masking patterns having attributes close to the attributes of the latent images, respectively, regardless of changes in viewing circumstance or the density fluctuations of device.

Figure 16A:
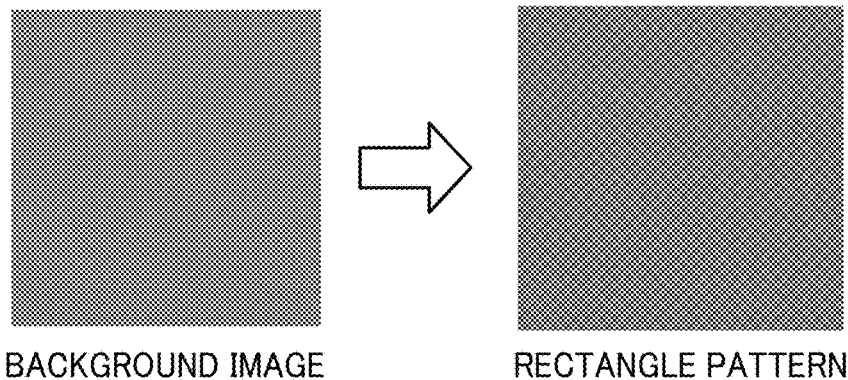
FIG. 16A is a diagram illustrating another example of visual masking pattern
Figure 16B:
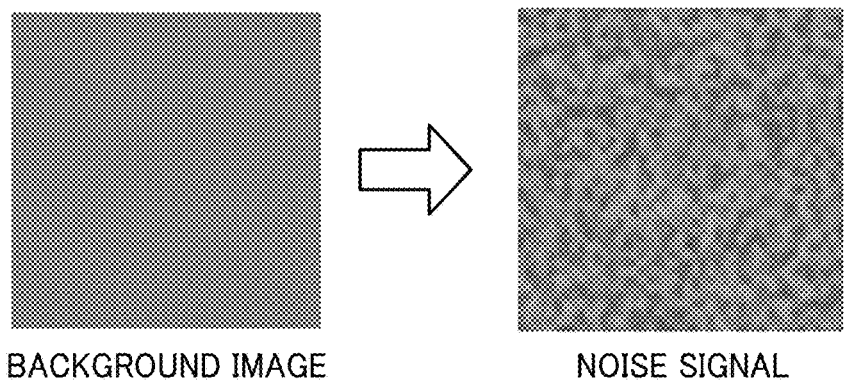
FIG. 16B is a diagram illustrating yet another example of visual masking pattern.

FIGS. 16A and 16B illustrate other examples of the visual masking pattern.

With reference to FIGS. 14A to 14C, a description is given above of a grid pattern formed in a two-dimensional sine wave to mask a QR code. Alternatively, a rectangle pattern as illustrated in FIG. 16A may be used.

Note that the grid pattern as illustrated in FIGS. 14A to 14C and the rectangle pattern as illustrated in FIG. 16A may be selected by, e.g., a user in consideration of the designability.

In a case in which a specific shape such as a circle, a quadrangle, or a QR code does not exist, a background image may be synthesized with an aperiodic noise signal, as illustrated in FIG. 16B, as a visual masking pattern. In other words, the spatial pattern is an aperiodic noise signal. Such an aperiodic signal has a relatively high affinity with any latent image shape. Adjustment of the period and the amount of noise of the aperiodic signal maintains the designability of the background image.

According to the present embodiment, in a technique of embedding an infrared latent image by a combination of visible colorants having different optical characteristics such as cyan, magenta, yellow, and black, a latent image is concealed by taking advantages of the color-matching masking effect and the visual masking effect that compensates for the defect of the color-matching masking effect in a mutually complementary manner. Accordingly, an enhanced stealth or confidential latent image is formed.

Note that, in the present embodiment, the visual masking effect and the color-matching masking effect are described as examples. Advantages of other different masking effects may be taken in combination depending on the properties of the background image and the latent image.

Referring now to FIGS. 17 to 25, a description is now given of a second embodiment of the present disclosure.

According to the first embodiment, the first masking unit 301 adds a visual masking pattern to a background image in the first masking process. The second masking unit 302 adds a gray component in the second masking process. By taking advantages of the visual masking and the color-matching masking, an enhanced stealth latent image is formed.

However, in a case in which an original background image includes a portion exhibiting a visual masking effect, such as a portion having a high contract, and a portion having a sufficient gray component and exhibiting a color-matching masking effect, the background image may not be subjected to the masking processes described above.

Therefore, in the second embodiment different from the first embodiment, the background image is segmented so that the visual masking effect and the color-matching masking effect are determined for each segment to search, in the background image, a portion in which an enhanced stealth latent image can be embedded. In the second embodiment, an enhanced stealth latent image is embedded by taking advantages of multiple masking effects such as the visual masking effect and the color-matching effect complementarily, without processing the background image as in the first embodiment. A redundant description of identical features in the first and second embodiments is herein omitted; whereas a description is now given of features of the second embodiment different from the features of the first embodiment.

Figure 17:
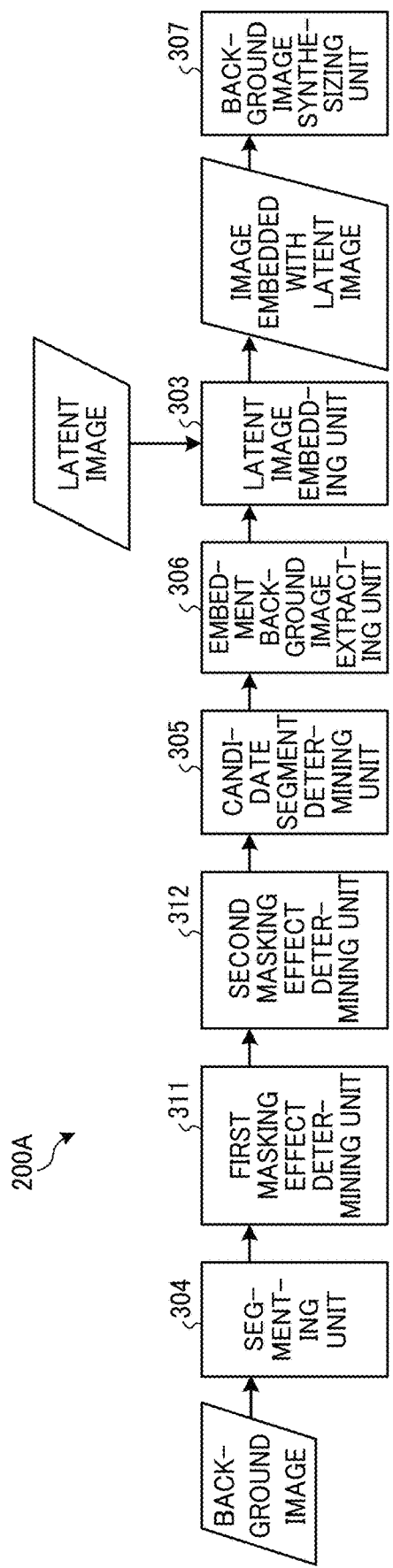
FIG. 17 is a functional block diagram of an image processing device according to a second example.

FIG. 17 is a functional block diagram of an image processing device 200A according to the second embodiment of the present disclosure.

As illustrated in FIG. 17, the image processing device 200A includes a first masking effect determining unit 311, a second masking effect determining unit 312, the latent image embedding unit 303, a segmenting unit 304, a candidate segment determining unit 305, an embedment background image extracting unit 306, and a background image synthesizing unit 307.

The segmenting unit 304 segments a background image into which a latent image is embedded.

Figure 18:
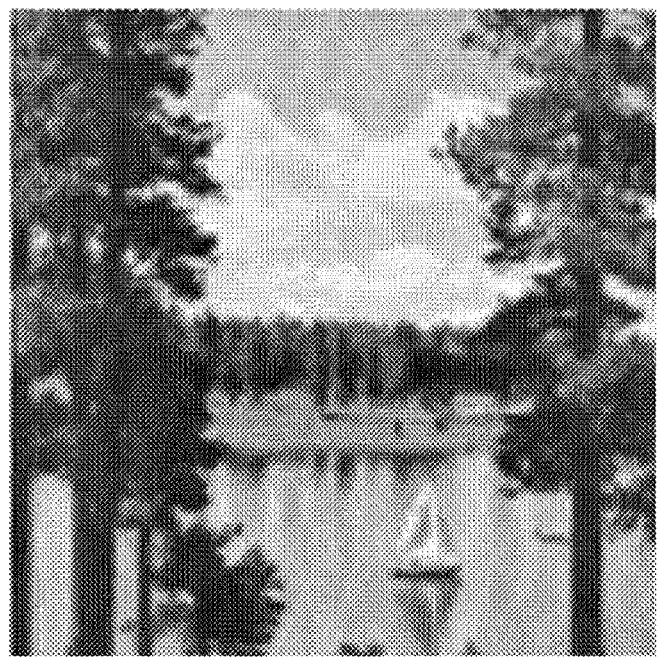
FIG. 18 is a diagram illustrating a background image.

FIG. 18 is a diagram illustrating an example of the background image.

As illustrated in FIG. 18, the background image of the present embodiment is a mixture of a portion having a high contrast and a portion having a relatively low contrast. The gray component may be present or absent depending on the segments of the background image.

Now, a description is given of segmentation of the background by the segmenting unit 304.

Figure 19:
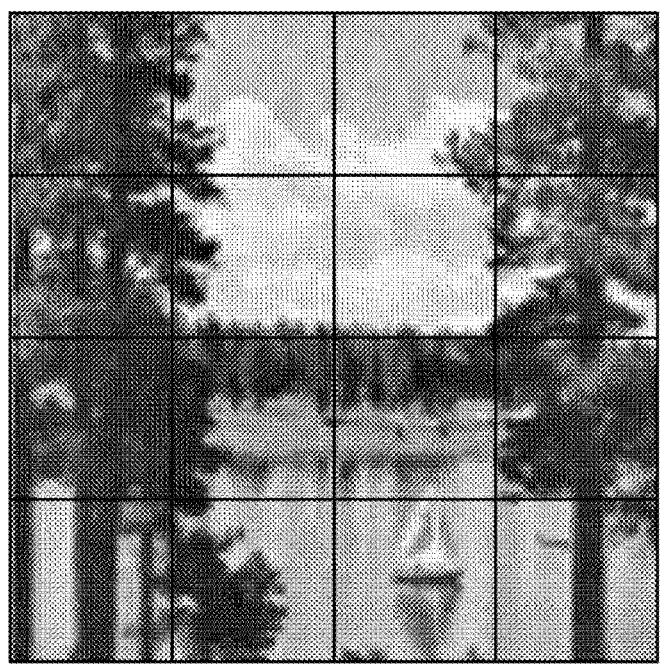
FIG. 19 is a diagram illustrating an example of segmentation of the background image.

FIG. 19 is a diagram illustrating an example of segmentation of the background image.

According to the example of segmentation illustrated in FIG. 19, the segmenting unit 304 segments the background image in a grid pattern. Note that the segmenting unit 304 may adjust the segment position for each user, instead of fixing the segment position.

The segmenting unit 304 outputs the segmented background image to the first masking effect determining unit 311.

The first masking effect determining unit 311 serving as an auxiliary masking effect determining unit determines, for each segment of the background image, a visual masking degree that indicates the effectiveness of visual masking.

FIG. 20 is a diagram illustrating an example of determination of the visual masking degree for the background image segmented as illustrated in FIG. 19.

A description is now given of some ways of determination of the visual masking degree.

Initially, a description is given of a first way of determination. According to the first way, the visual masking degree is determined as "large" when the segment of the background image includes a relatively large number of components contrasting sharply in shading. By contrast, the visual masking degree is determined as "small" when the segment of the background image includes a relatively small number of components contrasting sharply in shading. Such determination may be made based on a histogram distribution. In a case in which a pixel histogram distribution indicates a relatively large degree of dispersion, the segment of the background image includes pixels in a plurality of colors and has a relatively high contrast. By contrast, in a case in which the pixel histogram distribution indicates a relatively small degree of dispersion, the segment of the background image includes uniform pixels that construct a flat image.

A description is now given of a second way of determination. According to the second way, the visual masking degree is determined based on whether or not the segment of the background image includes, among the spatial frequency components that construct a latent image, a relatively large amount of main spatial frequency component (i.e., spatial frequency component of the latent image). The second way of determination is effective because the spatial frequency components of a background image close to the spatial frequency components of a latent image make it hard for human vision to separate signals, thus facilitating concealment of the latent image.

A description is now given of a third way of determination. According to the third way, a user, for example, visually determines whether an image in a segment has the contrast and subjectively evaluates the visual masking degree.

The second masking effect determining unit 312 serving as a color-matching masking effect determining unit determines, for each segment of the background image, a color-matching masking degree that indicates the effectiveness of color-matching masking.

FIG. 21 is a diagram illustrating an example of determination of the color-matching masking degree for the background image segmented as illustrated in FIG. 19.

A description is now given of a way of determination of the color-matching masking degree.

The color-matching masking degree is determined by analyzing pixel values such as red-green-blue (RGB) values or CMY values in a segment of the background image. Specifically, the second masking unit 302 analyzes the gray component in an RGB value or a CMY value. The gray component may be extracted by extracting a common component of the RGB value or the CMY value. For example, when CMY=(100%, 50%, 50%), 50% common in the CMY value may be extracted as a gray component. In the case of an RGB signal, the RGB signal may be converted into a hue-saturation-value (HSV) signal. The gray component may be determined by a value of saturation (S).

The gray component of an entire segment may be temporarily determined as a gray component for an average value of all the pixels of the segment. Alternatively, the gray component of the entire segment may be determined by counting pixel values having a predetermined gray component or greater. The color-matching masking degree is determined according to the amount of the gray component for each segment.

Note that a user, for example, may visually determine the saturation of an image in a segment and subjectively evaluate the color-matching masking degree.

The candidate segment determining unit 305 determines a candidate segment in which a latent image is embeddable or can be embedded, based on determination results of the visual masking degree and the color-matching masking degree.

Figures 22, 23:
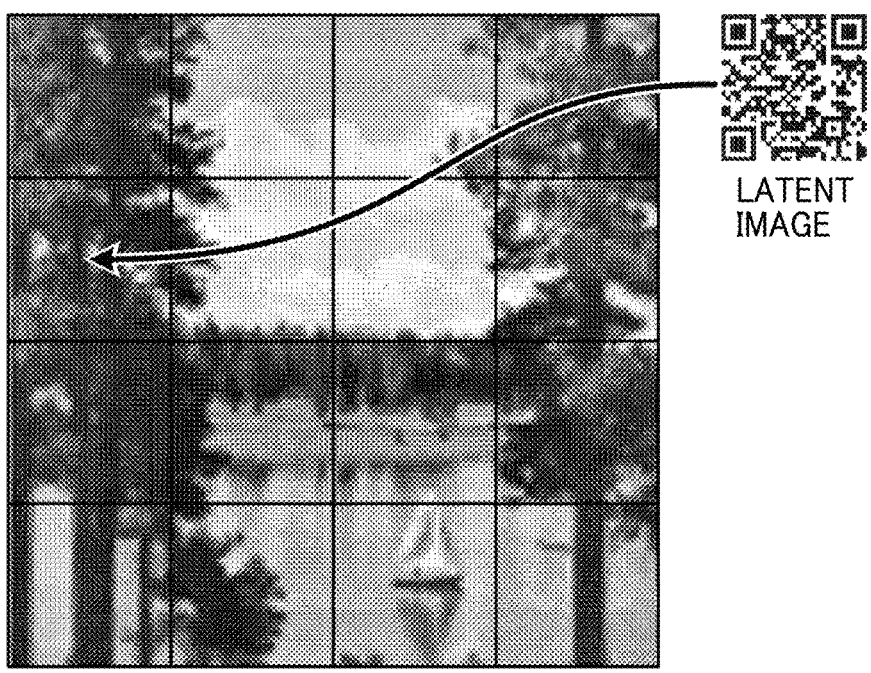
FIG. 22 is a diagram illustrating an example of determination of a segment in which a latent image can be embedded.
FIG. 23 is a diagram illustrating an example of determination of a target segment for embedding a latent image.

FIG. 22 is a diagram illustrating an example of determination of the candidate segment.

According to the example illustrated in FIG. 22, in the present embodiment, the candidate segment determining unit 305 determines, as a candidate segment, a segment for which both the visual masking degree and the color-matching masking degree are determined as "large". Note that this way of determination is adjustable as appropriate for the density of black used for embedment or the characteristics of the image forming apparatus 100.

The embedment background image extracting unit 306 selects or determines a target segment for embedding a latent image from candidate segments and extracts the selected segment (i.e., image area).

Figure 24:
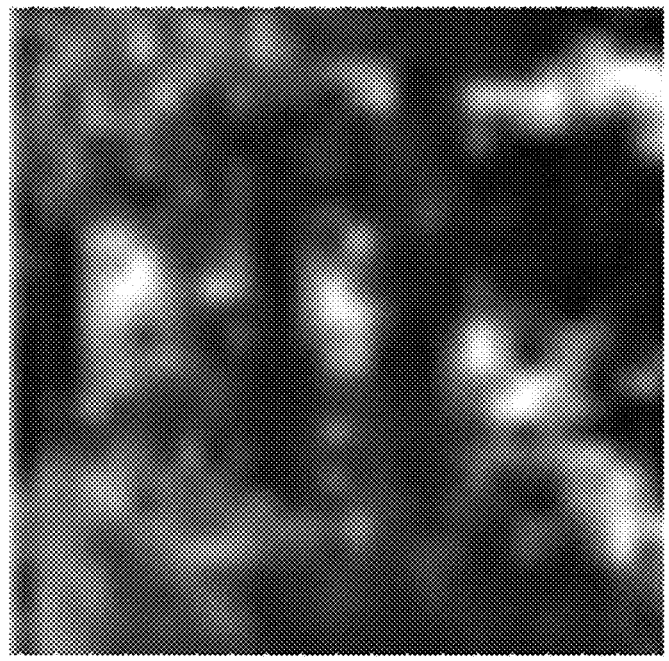
FIG. 24 is a diagram illustrating the target segment extracted.

FIG. 23 is a diagram illustrating an example of determination of the target segment. FIG. 24 is a diagram illustrating the target segment extracted.

Note that, in a case in which plural candidate segments are determined as illustrated in FIG. 22, a user, for example, can select any one of the plural candidate segments. As a consequence, according to the purpose, the user can embed a latent image in any segment selected from the candidate segments automatically calculated.

The latent image embedding unit 303 performs a latent image synthesizing process of embedding a specified latent image in the extracted target segment (or target image area) to generate an image embedded with the latent image.

Figure 25:
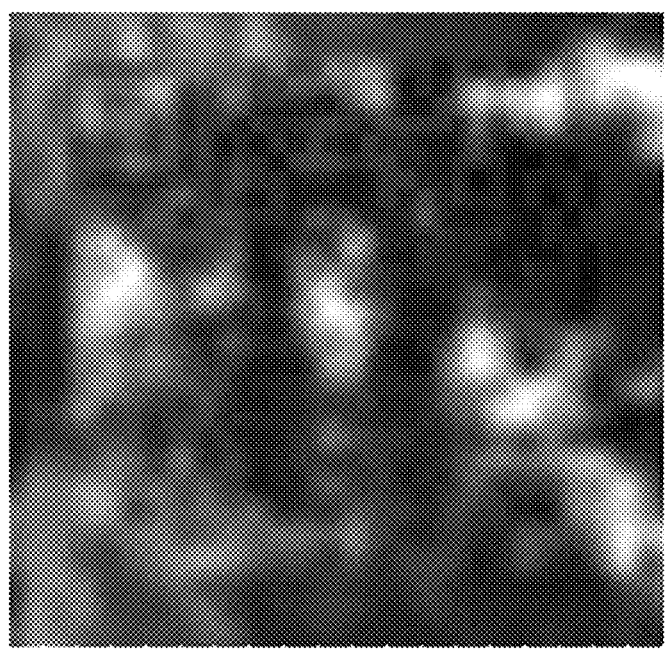
FIG. 25 is a diagram illustrating an image embedded with a latent image.

FIG. 25 is a diagram illustrating an example of the image embedded with the latent image.

The background image synthesizing unit 307 performs a process of synthesizing the generated image embedded with the latent image and the segment or area, from which the target segment is extracted, of the background image.

As described above, according to the present embodiment, a segment from which great visual masking effect and color-matching masking effect are obtained is determined in a background image. According to the determination result, a latent image is embedded in the determined segment. Accordingly, an enhanced stealth infrared latent image is formed by taking advantages of the visual masking effect and the color-matching masking effect.

Note that, in the processing of the second embodiment combined with the processing of the first embodiment, a pattern can be added in the visual masking process to address a small visual masking degree; whereas, to address a small color-matching masking degree, the color-matching masking process is performed on an image to turn a segment in which a latent image is unable to be embedded into a segment in which a latent image is able to be embedded.

Note that in the embodiments described above, the image processing devices 200 and 200A are applied to the image forming apparatus 100, which is an MFP having at least two of copying, printing, scanning, and facsimile functions. Alternatively, the image forming apparatus 100 may be, e.g., a copier, a printer, a scanner, or a facsimile machine.

An information processing device such as a print server or a client personal computer (PC) may be applied as the image processing device 200 or 200A described above. In such a case, the information processing device includes a CPU that operates according to an installed program, thereby performing substantially the same function as the function of the image processing device 200 or 200A to generate an image embedded with a latent image. The image forming apparatus 100 having a printing function prints image data including the image embedded with the latent image, which is generated by the information processing device, thereby producing a printed matter including an infrared latent image.

The processing units illustrated in FIGS. 3 and 17 are not necessarily arranged in the same image processing device or information processing device. For example, in FIG. 3, the first masking unit 301 may be implemented by an information processing device such as a print server or a client PC. The second masking unit 302 may be implemented by an image processing apparatus such as an MFP or a printer.

According to the embodiments of the present disclosure, an enhanced stealth latent image is formed by taking advantages of a color-matching masking effect and an effect that compensates for a defect of the color-matching masking effect in a mutually complementary manner to conceal the latent image.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein.

For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image processing device comprising circuitry configured to:
    process a background image into which a latent image is embedded, to obtain an effect to conceal the latent image;
    perform color conversion of the background image to obtain a color-matching masking effect to conceal the latent image;
    embed the latent image in the background image processed and converted, to generate an image embedded with the latent image;
    change a density change characteristic between pixels in the background image to obtain a visual masking effect to conceal the latent image; and
    synthesize a spatial pattern and the background image,
    wherein the spatial pattern is a spherical wave pattern having a distance from a specific position as phase information.

2. The image processing device according to claim 1, wherein the circuitry is configured to select one type of the spatial pattern from a plurality of types of the spatial pattern according to an attribute of the latent image.

3. The image processing device according to claim 1, wherein the spatial pattern is a grid pattern having coordinate information as phase information.

4. The image processing device according to claim 1, wherein the spatial pattern is a rectangular wave pattern.

5. The image processing device according to claim 1, wherein the spatial pattern is an aperiodic noise signal.

6. The image processing device according to claim 1, wherein the circuitry is configured to add a gray component as the color conversion of the background image.

7. An image processing device comprising circuitry configured to:
    process a background image into which a latent image is embedded, to obtain an effect to conceal the latent image;
    perform color conversion of the background image to obtain a color-matching masking effect to conceal the latent image;
    embed the latent image in the background image processed and converted, to generate an image embedded with the latent image;
    change a density change characteristic between pixels in the background image to obtain a visual masking effect to conceal the latent image; and
    synthesize a spatial pattern and the background image,
    wherein the circuitry is configured to determine one of a period and amplitude information of the spatial pattern according to an attribute of the latent image.

8. An image processing device comprising circuitry configured to:
    process a background image into which a latent image is embedded, to obtain an effect to conceal the latent image;
    perform color conversion of the background image to obtain a color-matching masking effect to conceal the latent image;
    embed the latent image in the background image processed and converted, to generate an image embedded with the latent image;
    change a density change characteristic between pixels in the background image to obtain a visual masking effect to conceal the latent image; and
    synthesize a spatial pattern and the background image,
    wherein one of a period and amplitude information of the spatial pattern is manually changeable.

9. The image processing device according to claim 6, wherein the circuitry is configured to determine the gray component according to a density of the latent image.

10. The image processing device according to claim 6, wherein the gray component is manually adjustable.

11. A method of embedding a latent image, the method comprising:
    processing a background image into which a latent image is embedded, to obtain an effect to conceal the latent image;
    performing color conversion of the background image to obtain a color-matching masking effect to conceal the latent image;
    embedding the latent image in the background image processed and converted, to generate an image embedded with the latent image;
    changing a density change characteristic between pixels in the background image to obtain a visual masking effect to conceal the latent image; and
    synthesizing a spatial pattern and the background image,
    wherein the spatial pattern is a spherical wave pattern having a distance from a specific position as phase information.

12. A non-transitory, computer-readable storage medium storing computer-readable program code that causes a computer to perform a method of embedding a latent image, the method comprising:

processing a background image into which a latent image is embedded, to obtain an effect to conceal the latent image;

performing color conversion of the background image to obtain a color-matching masking effect to conceal the latent image;

embedding the latent image in the background image processed and converted, to generate an image embedded with the latent image;

changing a density change characteristic between pixels in the background image to obtain a visual masking effect to conceal the latent image; and synthesizing a spatial pattern and the background image, wherein the spatial pattern is a spherical wave pattern having a distance from a specific position as phase information.

13. The image processing device according to claim 7, wherein the circuitry is configured to select one type of the spatial pattern from a plurality of types of the spatial pattern according to an attribute of the latent image.

14. The image processing device according to claim 8, wherein the circuitry is configured to select one type of the spatial pattern from a plurality of types of the spatial pattern according to an attribute of the latent image.

15. The method according to claim 11,
wherein the spatial pattern is a grid pattern having coordinate information as phase information.

16. The method according to claim 11,
wherein the spatial pattern is a rectangular wave pattern.

17. The method according to claim 11,
wherein the spatial pattern is an aperiodic noise signal.

18. The non-transitory, computer-readable storage medium according to claim 12,
wherein the spatial pattern is a grid pattern having coordinate information as phase information.

19. The non-transitory, computer-readable storage medium according to claim 12,
wherein the spatial pattern is a rectangular wave pattern.

20. The non-transitory, computer-readable storage medium according to claim 12,
wherein the spatial pattern is an aperiodic noise signal.

* * * * *